United States Patent
Conover

(10) Patent No.: US 9,058,232 B2
(45) Date of Patent: Jun. 16, 2015

(54) SYSTEMS AND METHODS TO CREATE A CLEAN INSTALL OF AN APPLICATION

(71) Applicant: CloudVolumes, Inc., Palo Alto, CA (US)

(72) Inventor: Matthew Conover, Mountain View, CA (US)

(73) Assignee: CLOUDVOLUMES, INC., Santa Clara, CA (US)

( * ) Notice: Subject to any disclaimer, the term of this patent is extended or adjusted under 35 U.S.C. 154(b) by 17 days.

(21) Appl. No.: 13/926,207

(22) Filed: Jun. 25, 2013

(65) Prior Publication Data

US 2013/0346961 A1    Dec. 26, 2013

Related U.S. Application Data

(60) Provisional application No. 61/663,824, filed on Jun. 25, 2012.

(51) Int. Cl.
  *G06F 9/445* (2006.01)
(52) U.S. Cl.
  CPC ....................... *G06F 8/61* (2013.01)
(58) Field of Classification Search
  USPC ............................................. 717/174
  See application file for complete search history.

(56) References Cited

U.S. PATENT DOCUMENTS

| | | | | |
|---|---|---|---|---|
| 6,347,398 | B1* | 2/2002 | Parthasarathy et al. | 717/178 |
| 6,370,686 | B1* | 4/2002 | Delo et al. | 717/174 |
| 6,698,018 | B1* | 2/2004 | Zimniewicz et al. | 717/175 |
| 7,284,157 | B1* | 10/2007 | McMichael et al. | 717/173 |
| 7,945,897 | B1* | 5/2011 | Cook | 717/121 |
| 8,407,693 | B2 | 3/2013 | Best et al. | |
| 2003/0037327 | A1* | 2/2003 | Cicciarelli et al. | 717/178 |
| 2010/0011351 | A1* | 1/2010 | Tsvi et al. | 717/174 |
| 2010/0106645 | A1* | 4/2010 | Peckover | 705/50 |
| 2012/0297462 | A1* | 11/2012 | Peckover | 726/4 |

OTHER PUBLICATIONS

Landau, "Getting Through Custom Installs", Jul. 1998, Macworld.*

* cited by examiner

*Primary Examiner* — Anna Deng
*Assistant Examiner* — Junchun Wu

(57) ABSTRACT

Disclosed herein are methods, systems, and software for computer application installation. In one example, a method of computer application installation includes executing a computer application installer. The method further provides, interrupting the computer application installer with a clean install mechanism, and forcing installation of all application components even if one or more of the application components was previously installed.

18 Claims, 5 Drawing Sheets

SYSTEMS AND METHODS TO CREATE A CLEAN INSTALL OF AN APPLICATION

RELATED APPLICATIONS

This application hereby claims the benefit of and priority to U.S. Provisional Patent Application 61/663,824, titled "SYSTEMS AND METHODS TO CREATE A CLEAN INSTALL OF AN APPLICATION", filed Jun. 25, 2012, and which is hereby incorporated by reference in its entirety.

BACKGROUND OF THE INVENTION

Computer applications typically require directories, registry keys, files, and other application components to operate on a computer operating system. These files direct the processing system to complete certain tasks for the end user of the computing device. Such tasks include word processing, calculations, image editing, among other operations—including combinations thereof.

Typically, when a user attempts to install an application, an installation may include the unpacking of files supplied in compressed form, copying them to suitable locations, tailoring the software to suit the hardware and the user's preferences, providing information about the operating system, and checking for shared files already installed on the machine. In cases where the machine contains shared files (often .dll files for Windows), the installer will typically not install these files as they are redundant for the application and may simply identify them as needed for the application. Similarly, other shared components such as directories and registry keys will also not be installed if they already exist on the system.

Overview

Examples disclosed herein provide methods, systems, and software for computer application installation. In one example, a method of computer application installation includes executing a computer application installer. The method further provides, interrupting the computer application installer with a clean install mechanism, and forcing installation of all application components even if one or more of the application components was previously installed.

In another instance, a computer readable medium having program instructions stored thereon that, when executed by a computing system, direct the computing system to execute a computer application installer. The program instructions further direct the computing system to interrupt the computer application installer with a clean install mechanism, and force installation of all application components even if one or more of the application components was previously installed.

In another example, a system for installing a computer application includes an application installer configured to query an operating system for shared application components and install application components on a computing system. The system further includes a clean install mechanism configured to interrupt the query of the operating system for the shared application components, and return that the shared application components are not present.

In a further instance, a method for operating a computer application installer includes executing the computer application installer, and forcing installation of all application components even if one or more of the application components was previously installed.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Systems and methods are provided herein to provide a "clean" install of an application by installing all application components (including but not limited to files, directories, and registry settings), even if some of the components were previously installed by other applications. In at least one example, a user will begin the installation by executing a standard application installer for the program (i.e., a .exe or .zip installer for windows, or a .tar.gz or .rpm installer for Linux). Within the standard application installer, the user can choose preferences such as the destination for the installation, the specific pieces of the application to install, among other preferences. Next, after the user has chosen to install the application, the application installer will attempt to inquire the operating system about shared application components, but will be intercepted by a clean install mechanism.

The clean install mechanism will stop the installer from locating the shared components and force the application to install all of the program's components. The install of all application components will ensure that each application installed is separate and does not have dependencies on other programs. Thus, applications can be added or removed without dependencies on one another.

Figure 1:
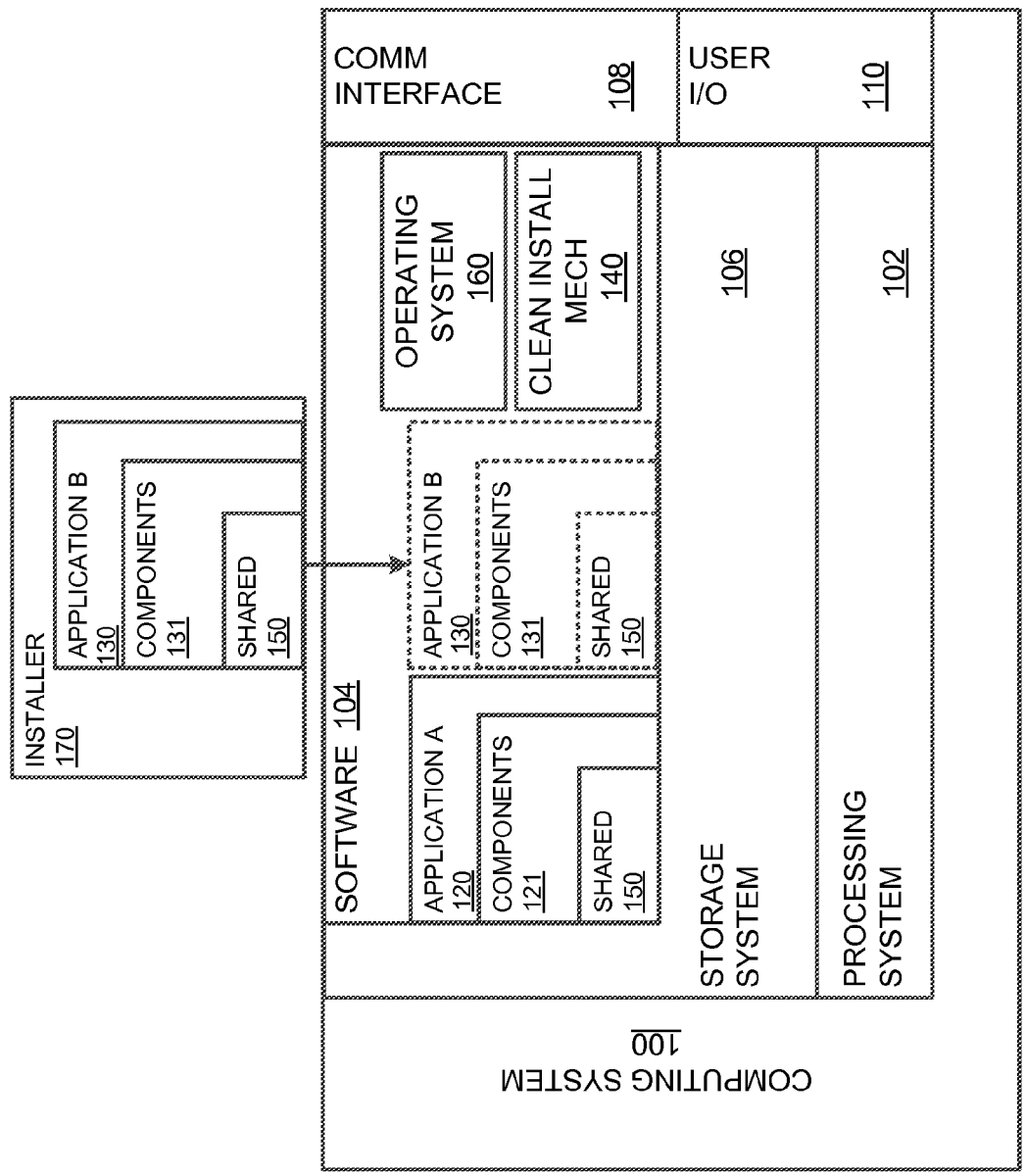
FIG. 1 illustrates a computing system for computer application installation according to one example.

FIG. 1 illustrates a computing system 100 with clean install capability. Computing system 100 may represent server computers, desktop computers, smart telephones, laptop computers, or other similar computing devices. Further, computing system 100 may represent a virtual machine, such as a virtual representation of a desktop computer, server computer, or other similar device. Computing system 100 includes processing system 102, software 104, storage system 106, communication interface 108, and user interface 110. Processing system 102 loads and executes software 104, including clean install mechanism 140, from storage system 106. When executed by computing system 100, software 104 directs processing system 102 to operate as a computing system described herein.

In one example, a user or service may select to install an application, such as application B 130, onto computing system 100. Application B 130 may include word processing applications, web browsing applications, analytical applications, or any other application capable of execution on computing system 100. Upon selection of the application, a computer application installer 170 may be executed that permits the user or the service to select the appropriate volume for the installation, the appropriate features for the installation, and any other relevant installation preferences. Once the preferences have been chosen, the installer will perform a shared application components query to operating system 160 to determine shared application components, such as shared components 150. Application components include, but are not limited to, files, directories, and registry settings.

Typically, operating system 160 will return a catalogue of the shared components to the application installer. However, in the present example, clean install mechanism 140, which may comprise a software module, will monitor for the execution of application installer 170 and will interrupt the query of operating system 160 to ensure that all application components are installed. In one example, clean install mechanism 140 may immediately intercept the shared application components query and return that no shared components, such as shared components 150, are present on computing system 100. In other examples, clean install mechanism 140 may work with operating system 160 to force a return to installer 170 that no shared components, such as shared components 150, are present on computing system 100. In further instances, clean install mechanism 140 may intercept the response of operating system 160 and return that no shared components are present on computing system 100.

Following the return that no shared components are present on computing system 100, installer 170 will install the application along with all of its components. As illustrated in FIG. 1, application B 130 is installed with components 131 and shared components 150. As a result, application B 130 does not rely on the shared components 150 of application A 120, but instead relies on its own copy of shared components 150.

In one example, clean install mechanism 140 may be implemented with computer application installer 170. In such instances, installer 170 will be executed to install the necessary application components and, instead of querying operating system 160, will install all necessary application components. Thus, application installer 170 will install all application components without a shared application components query. In some instances, skipping the shared application components query may be an install preference selected by the user of computing system 100. In other examples, installer 170 may skip the shared application components query based on the storage volume assigned for the application components or other install factors.

Application installer 170 may include .exe or .zip installers for windows, .tar.gz or .rpm installers for Linux, among other application installers. Installer 170 may include variety of install capabilities for installing application B on computing system 100. These install capabilities may include unpacking application components in compressed form, copying the application components to suitable locations, tailoring the software to suit the hardware and the user's preferences, providing information about the operating system, and checking for shared files already installed on the machine. In some examples of executing installer 170, installer 170 may be automated and attempt to install application B 130 without user input or interaction. In other instances of executing application installer 170, the user may select preferences such as a suitable install location in storage system 106, features for application 130, among other preferences—including combinations thereof. Based on these user preferences, installer 170 may unpack application components 131 and attempt to install components 131 in storage system 106.

Communication interface 108 comprises components that communicate over communication links, such as network cards, ports, RF transceivers, processing circuitry and software, or some other communication devices. Communication interface 108 may be configured to communicate over metallic, wireless, or optical links. Communication interface 108 may be configured to use TDM, IP, Ethernet, optical networking, wireless protocols, communication signaling, or some other communication format—including combinations thereof. Communication interface 108 may be omitted in some examples.

Referring still to FIG. 1, processing system 102 can comprise a microprocessor and other circuitry that retrieves and executes software 104 from storage system 106. Processing system 102 can be implemented within a single processing device, but can also be distributed across multiple processing devices or sub-systems that cooperate in executing program instructions. Examples of processing system 102 include general-purpose central processing units, application specific processors, and logic devices, as well as any other type of processing device, combinations of processing devices, or variations thereof.

Storage system 106 can comprise any storage media readable by processing system 102 and capable of storing software 104. Storage system 106 can include volatile and non-volatile, removable and non-removable media implemented in any method or technology for storage of information, such as computer readable instructions, data structures, program modules, or other data. Storage system 106 can be implemented as a single storage device but can also be implemented across multiple storage devices or sub-systems. Storage system 106 can comprise additional elements, such as a controller, capable of communicating with processing system 102.

Examples of storage media include random access memory, read only memory, magnetic disks, optical disks, flash memory, virtual and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In some implementations, the storage media can be a non-transitory storage media. In some implementations, at least a portion of the storage media can be transitory. It should be understood that in no case is the storage media a propagated signal.

User interface 110 can include a mouse, a keyboard, a voice input device, a touch input device for receiving a gesture from a user, a motion input device for detecting non-touch gestures and other motions by a user, and other comparable input devices and associated processing elements capable of receiving user input or user instructions. Output devices such as a video display or graphical display, speakers, printer, haptic devices, and other types of output devices can also be included in user interface 110. User interface 110 may be omitted in some examples.

Figure 2:
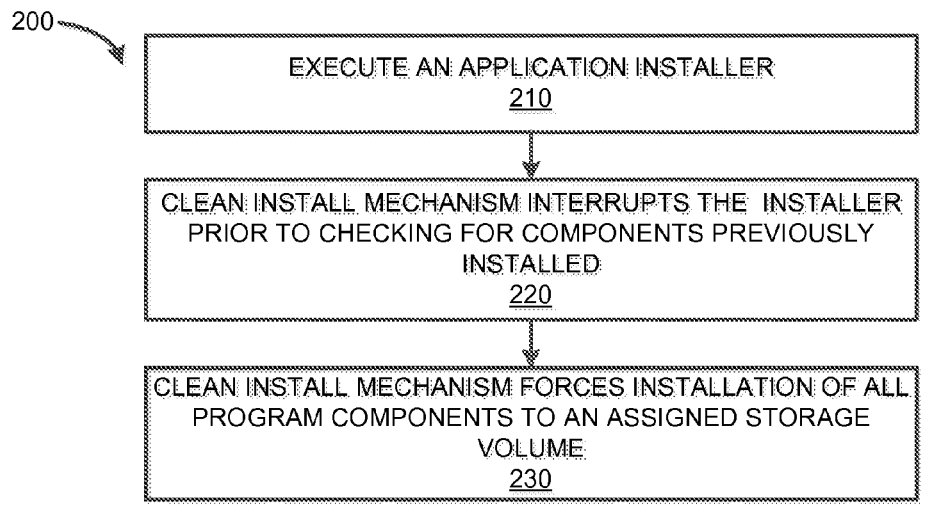
FIG. 2 illustrates an application installation method according to one example.

FIG. 2 is a flowchart illustrating a method for creating a clean install of an application. As illustrated in FIG. 2, the method begins at step 210 by executing the standard application installer. This application installer may seek preferences prior to installing application components, including the volume to install application components, the features to be installed with the application, among other preferences—including combinations thereof. After the preferences are selected, the application installer will perform a shared application components query to determine application components already installed on the destination computing system. During this inquiry, the query is immediately interrupted by the clean install mechanism at step 220. The clean install mechanism will stop the standard installer from checking for possible shared components and, instead, force the installer at step 230 to install all necessary application components to the appropriate volume. The volume capturing installed components in step 230 could be the C: drive for a Microsoft Windows operating system or any other volume.

In one example, the clean install mechanism could immediately return that no shared components exist to the standard installer. Thus, notifying the installer to install all application components. In an alternative instance, the clean install mechanism itself could install all application components. In other words, the clean install mechanism would not return anything to the application installer, but rather, install all the application components itself.

Figure 3:
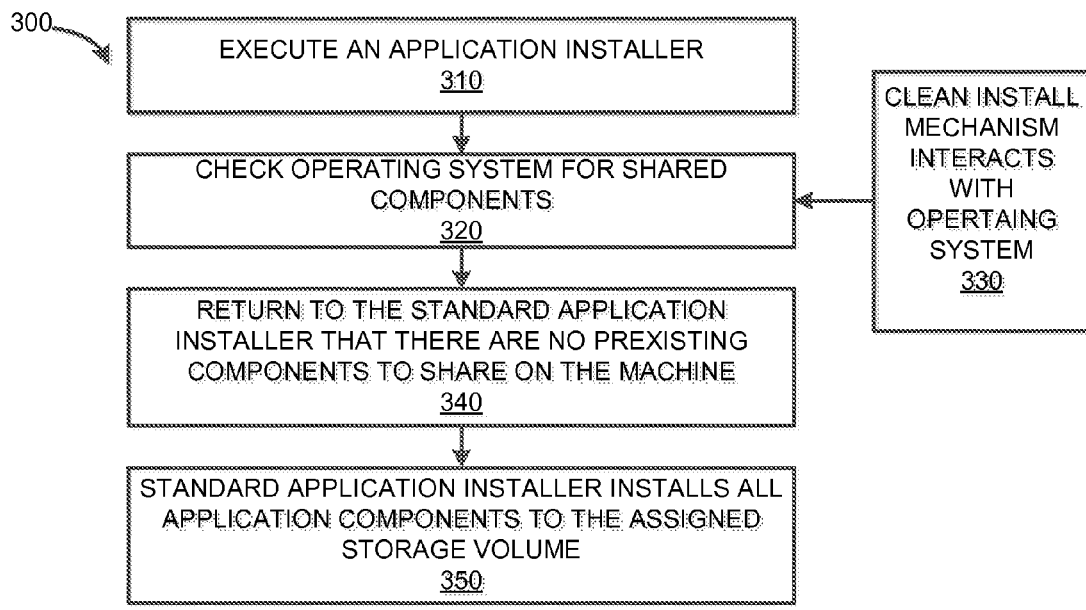
FIG. 3 illustrates an application installation method according to one example.

FIG. 3 is a flowchart illustrating a method 300 for creating a clean install of an application. As illustrated in FIG. 3, the method begins at step 310 by executing the standard application installer. Next, at step 320, the installer will query the operating system for possible shared application components already installed within the storage system. Upon the operating system obtaining the shared application components query, the clean install mechanism at step 330 will work with the operating system to return a value to the standard application installer asserting that there are no shared application components at step 340. Thus, the installer at step 350 will proceed to install all application components to the appropriate storage volume.

Figure 4:
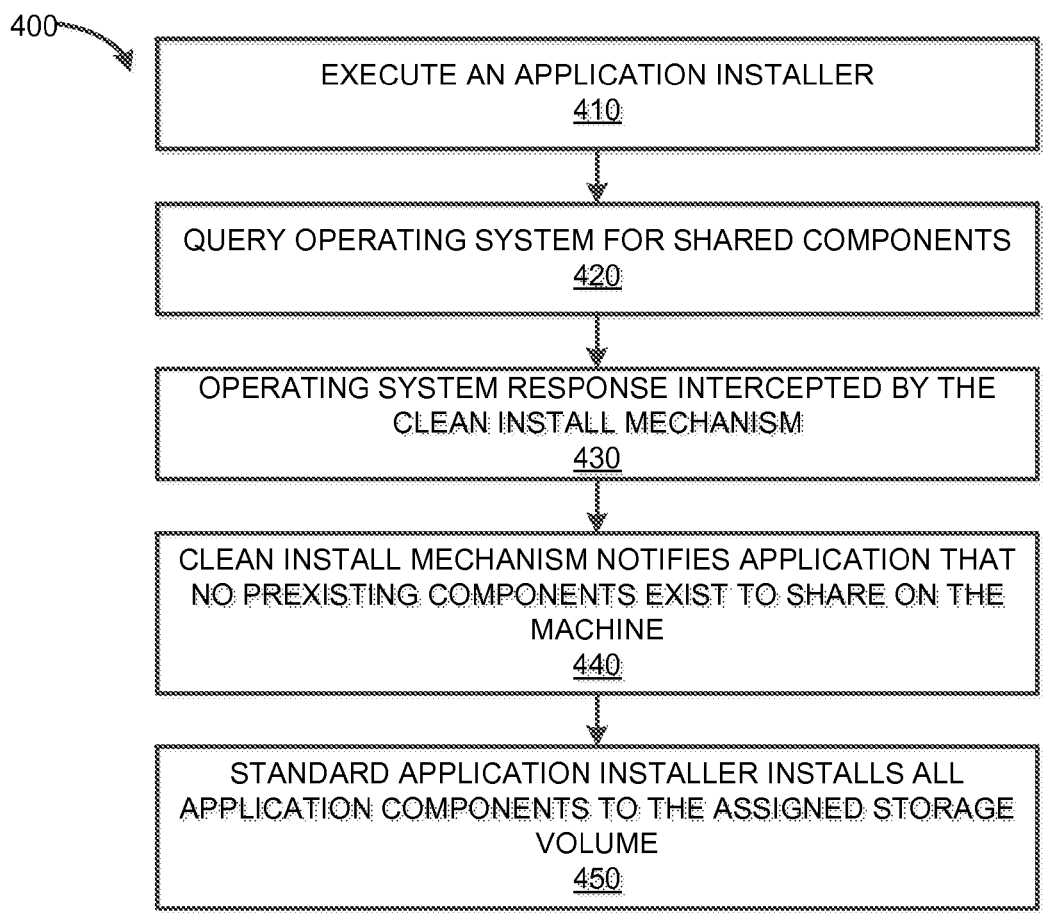
FIG. 4 illustrates an application installation method according to one example.

FIG. 4 is a flowchart illustrating a method 400 for creating a clean install of an application. As illustrated in FIG. 4, the method begins at step 410 by executing the standard application installer. Next, at step 420, the installer will inquire the operating system for possible shared or duplicate application components already installed. After this inquiry, the operating system will respond to the application installer with a catalogue of the components preexisting on the machine. However, prior to the installer receiving the information from the operating system, the clean install mechanism will interrupt the response at step 430. Instead of sending the installer the components that are already present on the system, the clean install mechanism will return that no shared application components are present (step 440). This will ensure that at step 450, the installer installs all application components to the appropriate volume including the files, directories, and registry keys.

Figure 5:
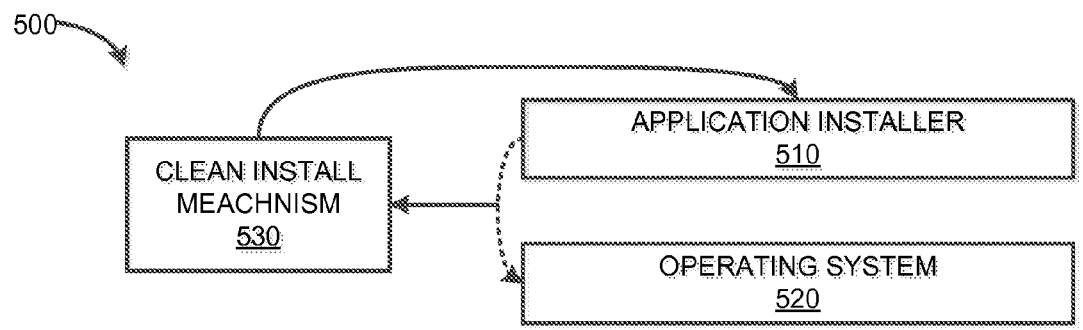
FIG. 5 illustrates an application installation system according to one example.

FIG. 5 illustrates a system 500 that includes a standard application installer 510, an operating system 520, and a clean install mechanism 530. In the illustrated example, standard application installer 510 will attempt to inquire operating system 520 about possible shared application components. Prior to the inquiry being received by operating system 520, clean install mechanism 530 will intercept the request. Clean install mechanism 530 will then return to standard application installer 510 that no shared components exist. In turn, standard application installer 510 will proceed to install all application components to the appropriate storage volume.

Figure 6:
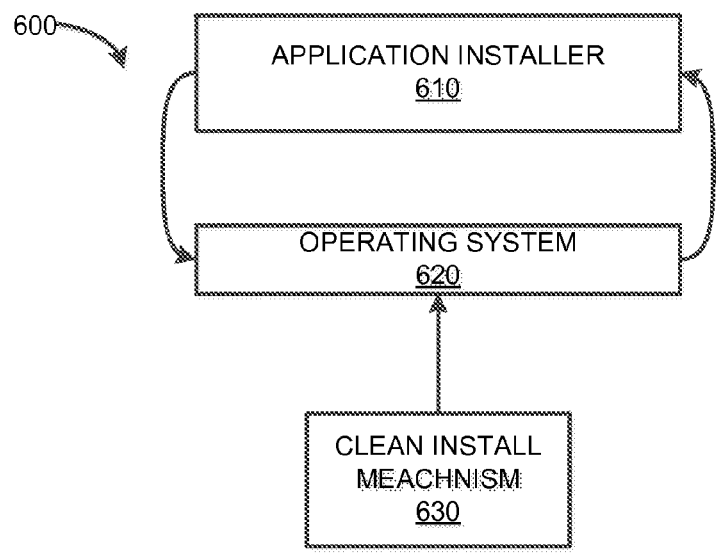
FIG. 6 illustrates an application installation system according to one example.

FIG. 6 illustrates a system 600 that includes a standard application installer 610, an operating system 620, and the clean install mechanism 630. In the illustrated example, the standard application installer 610 will inquire the operating system 620 about possible shared application components. During the inquiry of operating system 620, the clean install mechanism 630 will force the operating system 620 to return that no shared components exist. In turn, the standard application installer 610 will proceed to install all application components.

Figure 7:
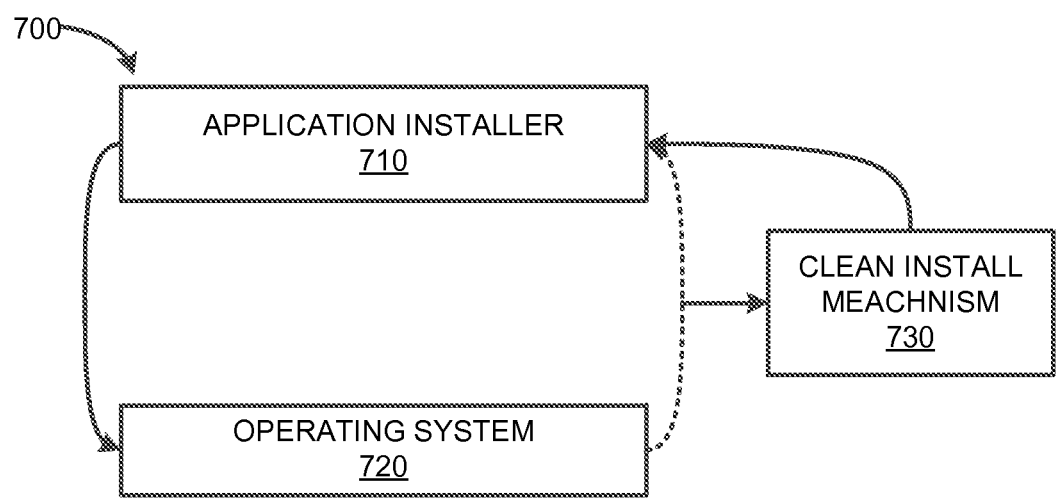
FIG. 7 illustrates an application installation system according to one example

FIG. 7 illustrates a system 700 that includes a standard application installer 710, an operating system 720, and the clean install mechanism 730. In the illustrated example, the standard application installer 710 will inquire the operating system 720 about possible shared application components. The operating system 720 will then check for shared application components and attempt return the shared components that exist. Prior to the return of the shared components, the clean install mechanism 730 will interrupt the operating system's response and, instead, return that no shared components exist. In turn, application installer 710 will proceed to install all application components.

The above description and associated figures teach the best mode of the disclosure. The following claims specify the scope of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific examples described above, but only by the following claims and their equivalents.

What is claimed is:

1. A method of computer application installation on a computing system, the method comprising:

monitoring for execution of a computer application installer;

intercepting, with a clean install mechanism, a shared application components query between the computer application installer and an operating system for the computing system, wherein the clean install mechanism stops the computer application installer from locating shared application components on the computing system; and in response to intercepting the shared application components query, returning to the computer application installer that there are no shared application components to force installation of all application components by the computer application installer even if one or more of the application components was previously installed.

2. The method of claim 1, wherein intercepting the shared application components query between the computer application installer and the operating system for the computing system comprises intercepting the shared application components query from the computer application installer before the shared application components query is received by the operating system.

3. The method of claim 1, wherein intercepting the shared application components query between the computer application installer and the operating system for the computing system comprises intercepting a response to the shared application components query from the operating system to the computer application installer.

4. The method of claim 1, wherein the application components comprise directories, registry keys, and files necessary to execute an application.

5. The method of claim 1, wherein executing a computer application installer comprises initiating an automated application installer based on user selected preferences.

6. The method of claim 1, wherein the clean install mechanism comprises a software module.

7. A non-transitory computer readable medium having program instructions stored thereon that, when executed by a computing system, direct the computing system to at least:

monitor for execution of a computer application installer;

intercept, with a shared install mechanism, a shared application components query between the computer application installer and an operating system, wherein the clean install mechanism stops the computer application installer from locating shared application components; and in response to intercepting the shared application components query, return to the computer application installer that there are no shared application components to force installation of all application components by the computer application installer even if one or more of the application components was previously installed.

8. The non-transitory computer readable medium of claim 7, wherein the program instructions to intercept the shared application components query between the computer application installer and the operating system direct the computing system to intercept the shared application components query from the computer application installer before the shared application components query is received by the operating system.

9. The non-transitory computer readable medium of claim 7, wherein the program instructions to intercept the shared application components query between the computer application installer and the operating system direct the computing system to intercept a response to the shared application components query from the operating system to the computer application installer.

10. The non-transitory computer readable medium of claim 7, wherein the application components include directories, registry keys, and files necessary to execute an application.

11. The non-transitory computer readable medium of claim 7, wherein the program instructions to monitor for execution of the computer application installer, direct the computing system to monitor for initiation of an automated application installer based on user selected preferences.

12. The non-transitory computer readable medium of claim 7, wherein the clean install mechanism comprises a software module.

13. A system for installing a computer application on a computing system, the system comprising:

a processing system configured to:

monitor for execution of a computer application installer;

intercept, with a shared install mechanism, a shared application components query between the computer application installer and an operating system, wherein the clean install mechanism stops the computer application installer from locating shared application components; and in response to intercepting the shared application components query, return to the computer application installer that there are no shared application components to force installation of all application components by the computer application installer even if one or more of the application components was previously installed.

14. The system of claim 13, wherein the processing system configured to intercept the shared application components query between the computer application installer and the operating system is configured to intercept the shared application components query from the computer application installer before the shared application components query is received by the operating system.

15. The system of claim 13, wherein the processing system configured to intercept the shared application components query between the computer application installer and the operating system is configured to intercept a response to the shared application components query from the operating system to the computer application installer.

16. The system of claim 13, wherein the shared application components include directories, registry keys, and files necessary to execute an application.

17. The system of claim 13, wherein the processing system is further configured to gather install preferences from a user of the computing system.

18. The system of claim 13, wherein the clean install mechanism comprises a software module.

* * * * *